United States Patent
Wilson et al.

(10) Patent No.: US 11,347,641 B2
(45) Date of Patent: May 31, 2022

(54) EFFICIENT MEMORY USAGE FOR SNAPSHOTS BASED ON PAST MEMORY USAGE

(71) Applicant: EMC IP Holding Company LLC, Hopkinton, MA (US)

(72) Inventors: Jeffrey Wilson, Franklin, MA (US); Michael Ferrari, Douglas, MA (US); Shruti Gupta, Hopkinton, MA (US); George F. Lettery, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 16/671,372

(22) Filed: Nov. 1, 2019

(65) Prior Publication Data

US 2021/0133098 A1 May 6, 2021

(51) Int. Cl.
*G06F 12/02* (2006.01)

(52) U.S. Cl.
CPC .. *G06F 12/0253* (2013.01); *G06F 2212/1044* (2013.01)

(58) Field of Classification Search
CPC ........... G06F 12/0253; G06F 12/122; G06F 2212/1044; G06F 2212/657; G06F 3/061; G06F 3/0608; G06F 3/064; G06F 3/065; G06F 3/067
See application file for complete search history.

(56) References Cited

U.S. PATENT DOCUMENTS

| | | | |
|---|---|---|---|
| 7,340,489 B2 | 3/2008 | Vishlitzky et al. | |
| 8,635,422 B1 * | 1/2014 | Kaliannan | G06F 3/0652 711/170 |
| 9,965,216 B1 | 5/2018 | Jaganathan et al. | |
| 10,706,014 B1 * | 7/2020 | Gupta | G06F 3/064 |
| 2012/0254505 A1 | 10/2012 | Chishtie et al. | |
| 2016/0253103 A1 * | 9/2016 | Foley | G06F 12/0276 711/154 |
| 2017/0220623 A1 * | 8/2017 | Blount | G06F 16/24578 |
| 2017/0315740 A1 | 11/2017 | Corsi et al. | |
| 2018/0190329 A1 | 7/2018 | Kathawala et al. | |

(Continued)

OTHER PUBLICATIONS

U.S. Appl. No. 16/671,372, filed Nov. 1, 2019, Wilson, et al.
U.S. Appl. No. 16/672,228, filed Nov. 1, 2019, Wilson, et al.

*Primary Examiner* — Michael Krofcheck

(74) *Attorney, Agent, or Firm* — Muirhead and Saturnelli, LLC

(57) ABSTRACT

Snapshot metadata may include a plurality of pages of nodes, including active nodes and free nodes. It may be determined whether a snapshot metadata object is eligible for de-allocation, for example, of one or more of the pages of its snapshot metadata nodes. This determination may be based on a number of free nodes in the snapshot metadata object, for example, in relation to the quantity of nodes that are included in a snapshot metadata page. This determination may be made based on previous usage of the nodes allocated to the snapshot metadata object, for example, the number of active nodes relative to a total size of the snapshot metadata object. For example, a maximum extent of active nodes during one or more periods may be compared to a current extent of active nodes to determine whether the snapshot metadata object is eligible.

14 Claims, 14 Drawing Sheets

(56) References Cited

U.S. PATENT DOCUMENTS

2018/0196745 A1* 7/2018 Karr .................. G06F 16/162
2018/0253376 A1   9/2018 Nishikubo et al.
2020/0265020 A1   8/2020 Gupta et al.

* cited by examiner

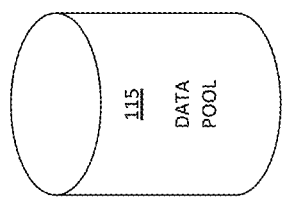
FIG. 6
FIG. 7
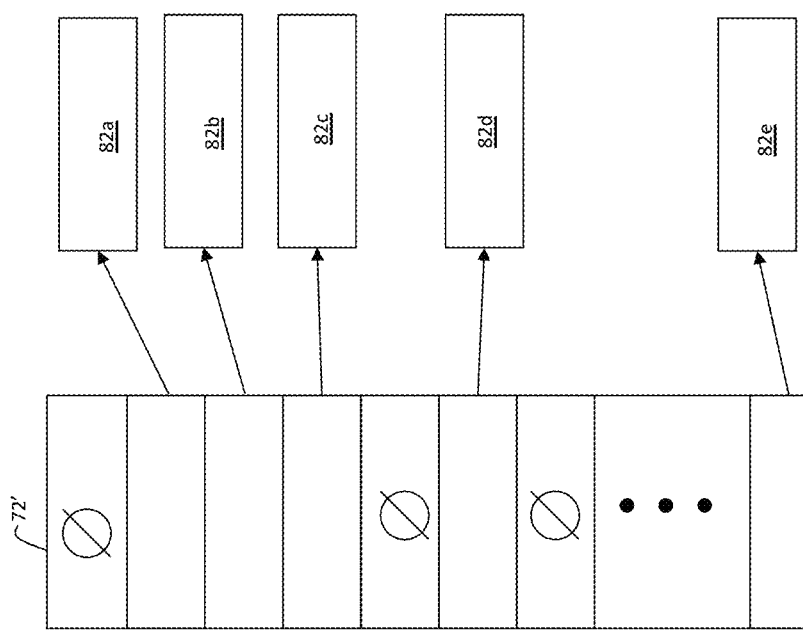
FIG. 4

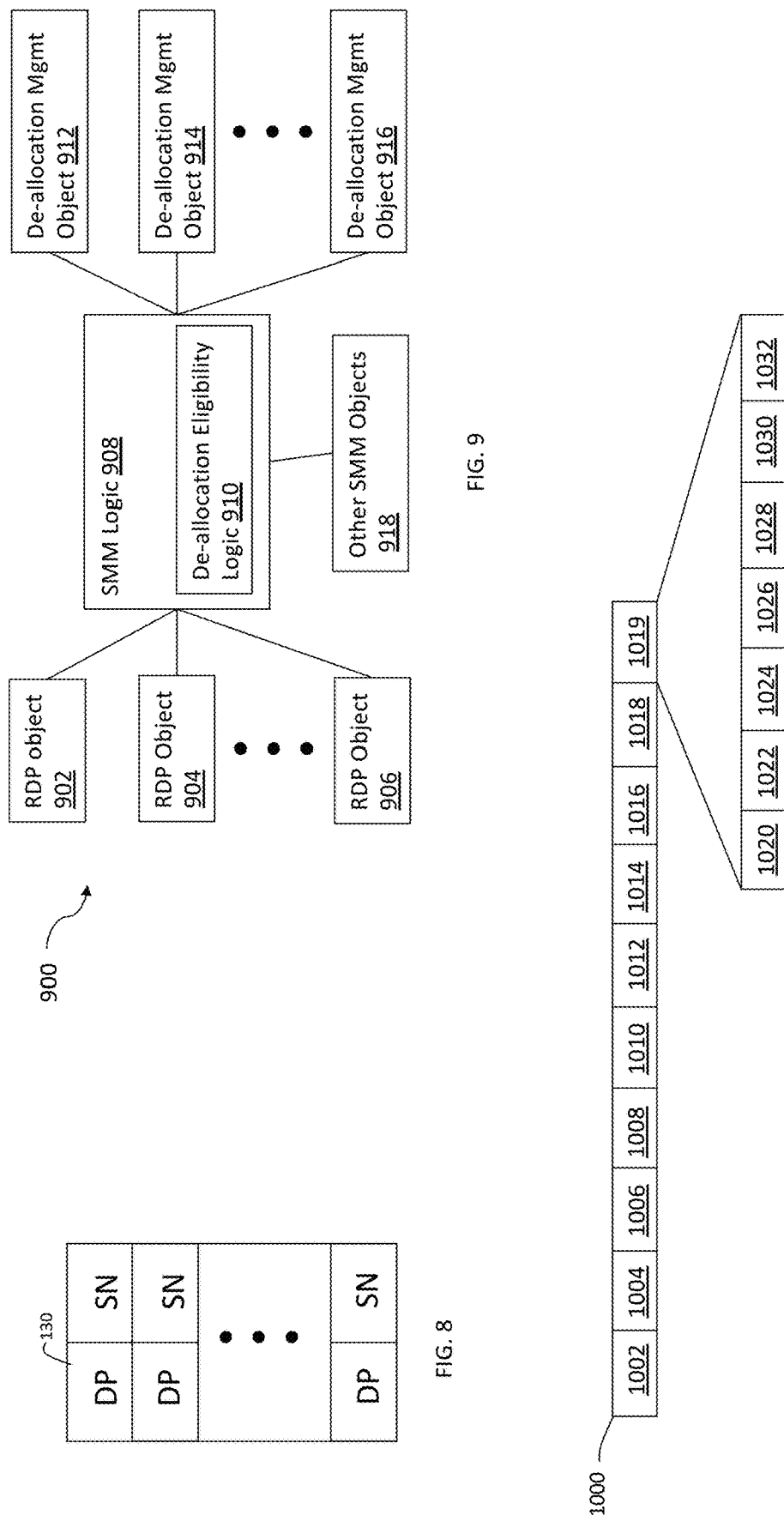

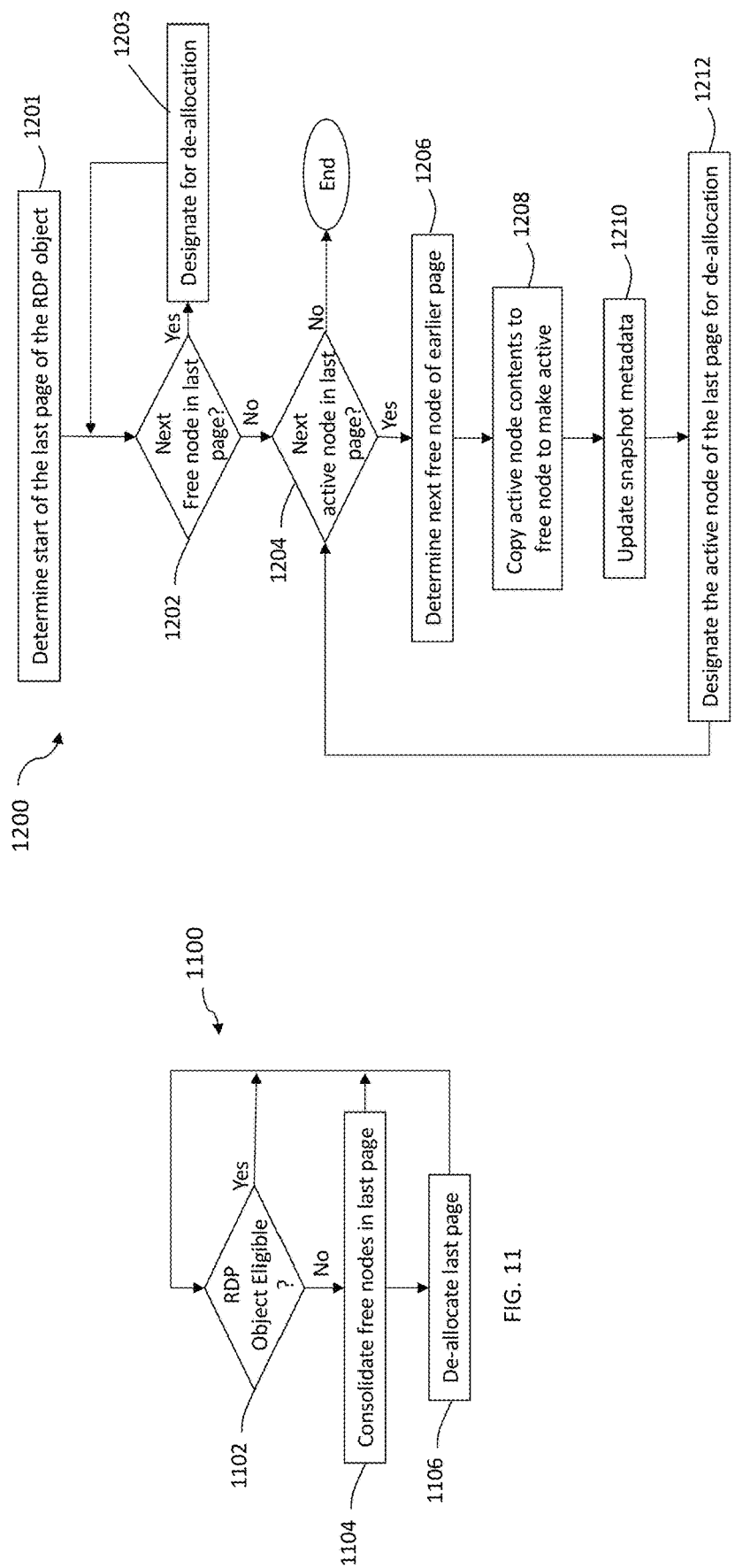

EFFICIENT MEMORY USAGE FOR SNAPSHOTS BASED ON PAST MEMORY USAGE

BACKGROUND

Technical Field

This application generally relates to data storage systems, and more particularly to data replication on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used.

It may be desirable to be able to quickly get a consistent snapshot of data of a logical volume (e.g., a logical device). Snapshot functionality may be provided on a storage system using protection bits to indicate when a track needs to be copied to a target logical device for the snapshot. Such snapshot functionality is described, for example, in U.S. Pat. No. 7,340,489 to Vishlitzky, et al. titled "VIRTUAL STORAGE DEVICES", which is incorporated by reference herein. A session corresponding to the protection bit may be established so that when a protection bit is set, a write operation to a track of the storage device is intercepted before the write operation modifies the track. However, each snapshot uses at least one of the session bits (which are provided separately for each data increment, such as a track) and uses a snapshot target volume, both of which require a significant amount of overhead. In instances where it is desirable to have a large number of snapshots, this associated overhead may be unacceptable.

Accordingly, it may be desirable to provide a system where it is possible to maintain a relatively large number of snapshots for a logical device without incurring the significant amount of overhead that would be associated with snapshots provided using conventional snapshot mechanisms, like the snapshot mechanism described above.

Targetless snapshots may reduce an amount of overhead incurred in maintaining a relatively large number of snapshots, compared to the above-described conventional snapshot mechanisms. Targetless snapshots are described in U.S. Pat. No. 9,965,216, titled "Targetless Snapshots," issued May 8, 2018, to Jaganathan et al. ("the Jaganathan patent").

SUMMARY OF THE INVENTION

In some embodiments of the invention, a method is performed for a data structure including snapshot metadata for a logical storage unit and residing in a portion of memory of a data storage system allocated to the data structure, the data structure including a plurality of pages, wherein each page including a first quantity of nodes and wherein each node is either an active node currently being used and corresponding to a data portion of the logical storage unit or a free node eligible for use for a data portion of the logical storage unit. The method includes determining a first maximum extent of active nodes within the data structure at a point in time during a first period, determining a current extent of active nodes within the data structure, determining whether to de-allocate a plurality of the free nodes of the data structure from the portion of memory based at least in part on the first maximum extent and the current extent, and, if it is determined to de-allocate a plurality of the free nodes, de-allocating the plurality of the free nodes from the portion of memory. The method may further include determining a second maximum extent of active nodes within the data structure during a second period including the point in time at which the current extent is determined, where determining whether to de-allocate is based at least in part on the second maximum extent. Determining whether to de-allocate may include determining a maximum value from the first maximum extent and the second maximum extent, determining if the current extent is greater than the maximum value, and determining to de-allocate if the current extent is greater than the maximum value. De-allocating the plurality of the free nodes from the portion of memory may include consolidating the first quantity of the free nodes in a first page of the plurality of pages, and de-allocating the first page from the portion of memory allocated to the data structure. Consolidating may include exchanging active nodes of the first page for free nodes of one or more other pages of the plurality of pages. Maximum extents may be determined for a plurality of periods, each period having a first length, where the data structure is one a plurality of data structures tracking versions of data portions of logical storage units on the data storage system, and where the method may further include determining a collective amount of the memory consumed by the plurality of data structures, determining if the amount of memory exceeds a threshold amount, and if the amount of memory exceeds a threshold amount, changing the first length to a second length shorter than the first length. The first period may be a previous calendar day from a time at which the current extent is determined.

In some embodiments, a data storage system includes a memory, and a data structure including snapshot metadata for a logical storage unit and residing in a portion of the memory allocated to the data structure, the data structure including a plurality of pages, wherein each page including a first quantity of nodes, and wherein each node is either an active node currently being used and corresponding to a data portion of the logical storage unit or a free node eligible for use for a data portion of the logical storage unit. The memory has code stored thereon that, when executed, performs the above-described method.

In some embodiments, one or more computer-readable media, for example, non-transitory computer-readable media, are provided for a data structure including snapshot metadata for a logical storage unit and residing in a portion of memory of a data storage system allocated to the data structure, the data structure including a plurality of pages, wherein each page including a first quantity of nodes, and wherein each node is either an active node currently being used and corresponding to a data portion of the logical storage unit or a free node eligible for use for a data portion of the logical storage unit. The one or more computer-readable media has software stored thereon that includes executable instructions to perform the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 6 is a block diagram showing a data pool, according to embodiments of the invention.

FIG. 7 is a block diagram showing a snapshot table, according to embodiments of the invention;

FIG. 8 is a block diagram showing a sequence number pointer, according to embodiments of the invention;

FIG. 9 is a block diagram illustrating an example of a system for managing snapshot metadata, according to embodiments of the invention;

FIG. 10 is a block diagram illustrating an example of a data structure for managing the de-allocation of snapshot metadata from memory;

FIG. 11 is a flowchart illustrating an example of a method of managing snapshot metadata, according to embodiments of the invention;

FIG. 12 is a flowchart illustrating an example of a method of consolidating free nodes into a last page of a data structure for managing snapshot metadata, according to embodiments of the invention;

FIGS. 13A-13F illustrate an example of de-allocating a portion of memory used to manage snapshot metadata, according to embodiments of the invention;

DETAILED DESCRIPTION OF EMBODIMENTS

Using targetless snapshots may involve use of data structures for snapshot metadata, for example, data structures that track versions of data for logical devices corresponding to specific snapshots. These data structures may be referred to herein as replication data pointer (RDP) objects. Each RDP object may correspond to a portion of a logical device (or other type of logical storage unit (LSU) described in more detail elsewhere herein), for example, a logical block address (LBA) range of the logical device. Such a portion of a logical device or other type of LSU may be referred to herein as an "LSU zone." Each RDP object may track versions of data of its corresponding LSU zone relative to snapshots.

Each RDP object may include a plurality of nodes, each node corresponding to, or having previously corresponded to, a data portion of the LSU zone corresponding to the RDP object. The plurality of nodes may include active nodes and free nodes. For a data portion (e.g., a track) of an LSU zone, each time a first write operation is made to the data portion following a most recent snapshot of the LSU of the LSU zone, a new active node may be created in the RDP object, the new active node being associated with the most recent snapshot. The new active node may include a pointer to a copy of the data portion at a point of time of the snapshot, before the first write operation that caused creation of the active node. The contents and function of active nodes are described in more detail elsewhere herein.

Figures 13A, 13B:
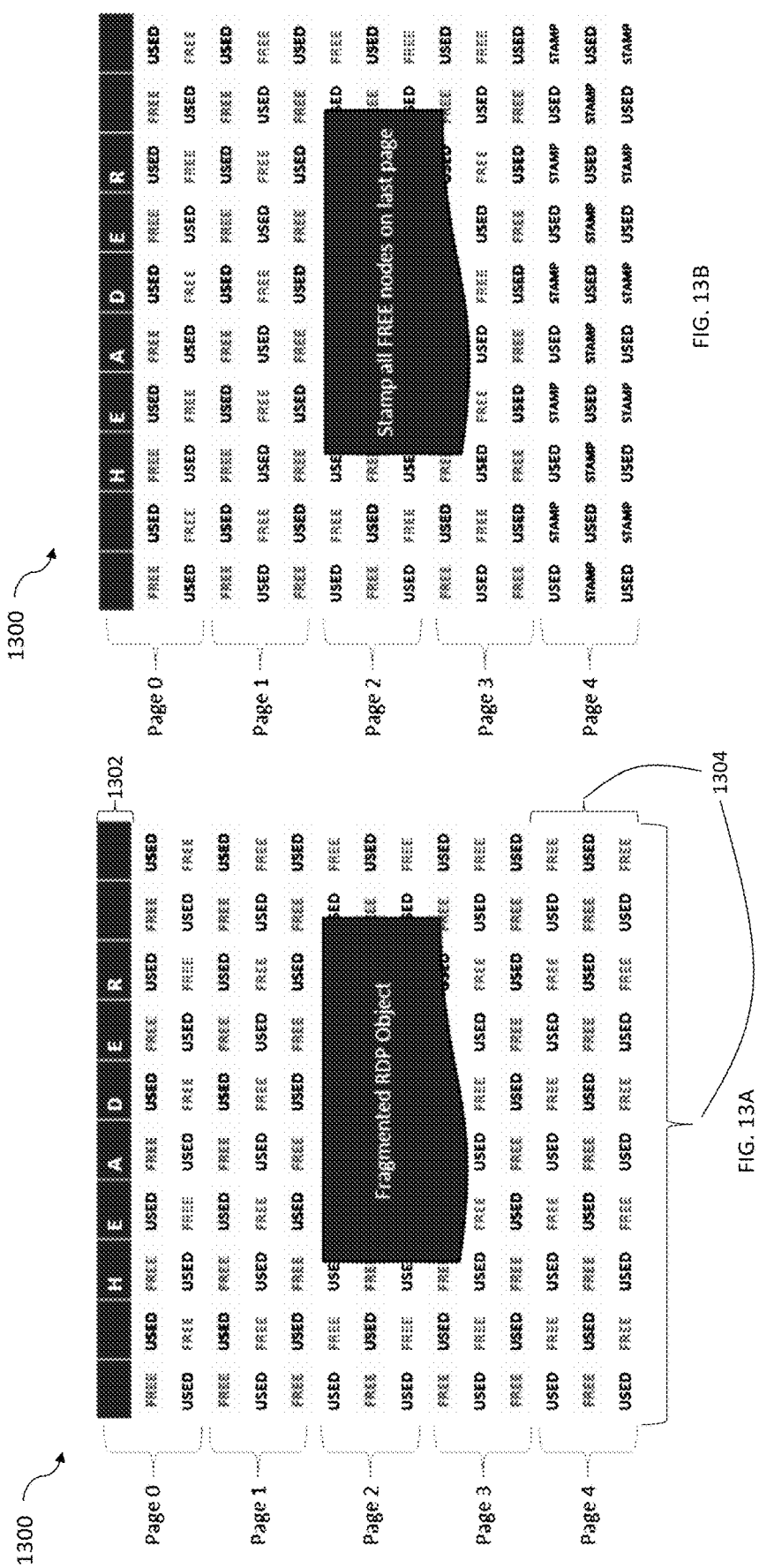

Each time a snapshot is deleted from a storage system, any active nodes associated with the snapshot may be cleared and freed up to be used again, i.e., may become "free" nodes. An RDP object may include a plurality of active nodes and a plurality of free nodes (e.g., as shown in FIG. 13A described in more detail elsewhere herein), and the status of a node as active or free may change over time. For example, a free node may be re-used and made active again, and then freed up again, and so on.

An RDP object may be stored in memory of the storage system allocated for the RDP object. The memory may be organized into memory pages of a predefined size, for example, 4 KB. A page may be the smallest unit of memory management of the storage system such that a page is the smallest unit of memory that may be allocated or de-allocated at a given time. Pages of memory may be allocated to an RDP object as needed. An RDP object may be considered to be organized into pages of nodes, the pages corresponding to memory pages. As noted above, free nodes may be re-used as active nodes. However, if the need for more active nodes outpaces the rate at which free nodes are being created (e.g., as a result of deleting snapshots), pages may continue to be added to the tracking data structure so that the size (memory footprint) of the RDP object grows.

The memory footprint of an RDP object depends not only on the number of data portions in its corresponding LSU zone, but also on the frequencies with which snapshots are created and deleted (e.g., which may be defined in a snapshot policy) for the LSU of the LSU zone, and how frequently write operations are performed for data portions of the LSU zone relative to the frequency of snapshot creation. For example, sometimes an LSU zone may be "hot" in that frequent writes are made to data portions of the LSU zone, whereas at other times an LSU zone may be "cold" in that it is written-to infrequently. When an LSU zone is hot, several pages of nodes may be added to its RDP object. However, when the LSU zone cools down, the RDP object pages remain, even though many of the nodes included therein are free nodes. That is, while there is a mechanism for increasing the size of an RDP object as needed, there may be no mechanism to reduce the size of the RDP object when the increased size in longer needed.

Thus, the above-described process and the resulting RDP object makes inefficient use of memory space that could be used for other purposes. Further, a storage system may have a plurality of LSUs (e.g., logical devices), and the RDP objects for each of these LSUs may suffer from the above-described inefficient use of memory space. The memory consumption resulting from this collective inefficient use of space may limit an amount of memory available for other storage system functions, may impact system performance, and may require procurement of more memory and/or other adjustments to the storage system to address performance.

What is desirable is more efficient use of memory space for snapshot metadata when implementing snapshots.

Described herein are improved mechanisms and techniques for implementing snapshots, for example, targetless snapshots, which use memory resources for snapshot metadata more efficiently than conventional solutions. By making more efficient use of memory for snapshot metadata, the conserved memory may be used for other purposes, performance of the system may be improved, and less (e.g., no) additional memory may need to be procured.

Embodiments of the invention are frequently described herein with reference to RDP objects. However, it should be appreciated that the invention is not so limited, and may be applied to other snapshot metadata structures as well.

Memory may be used more efficiently for snapshot metadata by reducing a size of an RDP object (i.e., shrinking the RDP object), for example, by removing free nodes from the RDP object. Removing free nodes may be achieved by consolidating free nodes into a single page of an RDP object, and de-allocating the page from the memory allocated for the RDP object.

Consolidation of free nodes may be achieved by identifying active nodes in the single page, and swapping these active nodes with free nodes from other pages until the single page includes only free nodes. Such swapping may be achieved by copying the contents of the active node into the free node, and changing the free node into an active node. The nodes of the single page that were already free and the active nodes that were swapped with free nodes from another page (e.g., the active nodes whose contents were copied) may be designated for de-allocation. This designation may be achieved by marking the nodes themselves; i.e., by altering the contents of these nodes, for example, by stamping them with a value, and by additionally or alternatively removing them from a list of free nodes. This designating may result in all of the nodes of the single page being designated for de-allocation, after which the single page of nodes may be de-allocated. While the above process is described in relation to a single page, it should be appreciated that it could be performed for multiple pages.

It should be appreciated that consolidating free nodes in one RDP page for de-allocation results in active nodes being consolidated in the remaining one or more RDP pages, albeit these remaining pages may still include free nodes as well. These consolidations may be considered a defragmenting of an RDP object.

In some embodiments, the RDP pages have a logical order from first to last, and within each RDP page, the nodes may have a logical order from first to last. The logical order of nodes may correspond to logical memory addresses of the nodes, and the logical order of RDP pages may correspond to a logical range of memory addresses. In embodiments in which RDP pages have a logical order from first to last, and the nodes within each page have a logical order, the single node into which free nodes may be consolidated may be a last page in the logical order. Further, in such embodiments, for each active node of the last page to be swapped, a free node may be selected that is the earliest (i.e., closest to the first in the logical order) remaining free node from an earliest RDP page having any remaining free nodes. Consolidating free nodes in a last page, and selecting free nodes from as early as possible in the RDP object (or at least from an earliest possible page) may result in a least amount of multiple swappings involving a same node over time.

In some embodiments, a data portion is a logical track of an LSU, and has a size of 128 KB; and an LSU zone represents a size of 3,840 tracks=3,840×128 KB=~500 MB. Further, in some embodiments, a memory page has a size of 4 KB, and an RDP node has a size of 32 bytes, in which each RDP page of an RDP object includes 128 nodes, except perhaps for a first page, as described in more details elsewhere herein. Other sizes and quantities of the foregoing are possible and intended to fall within the scope of the invention.

In some embodiments, a determination may be made as to whether an RDP object is eligible for de-allocation, for example, of one or more pages of its RDP nodes. This determination may be based on a number of free nodes in the RDP object, for example, in relation to the quantity of nodes that are included in an RDP page. In some embodiments, this determination may be made based on previous usage of the nodes allocated to the RDP object, for example, the number of active nodes relative to a total size of the RDP object. For example, a maximum extent (e.g., absolute amount or percentage) of active nodes during one or more periods (e.g., an immediately preceding period and current period) may be compared to a current extent of active nodes to determine whether the RDP object is eligible, as described in more detail elsewhere herein.

Illustrative embodiments of the invention will now be described in more detail in relation to the figures.

Figure 1:
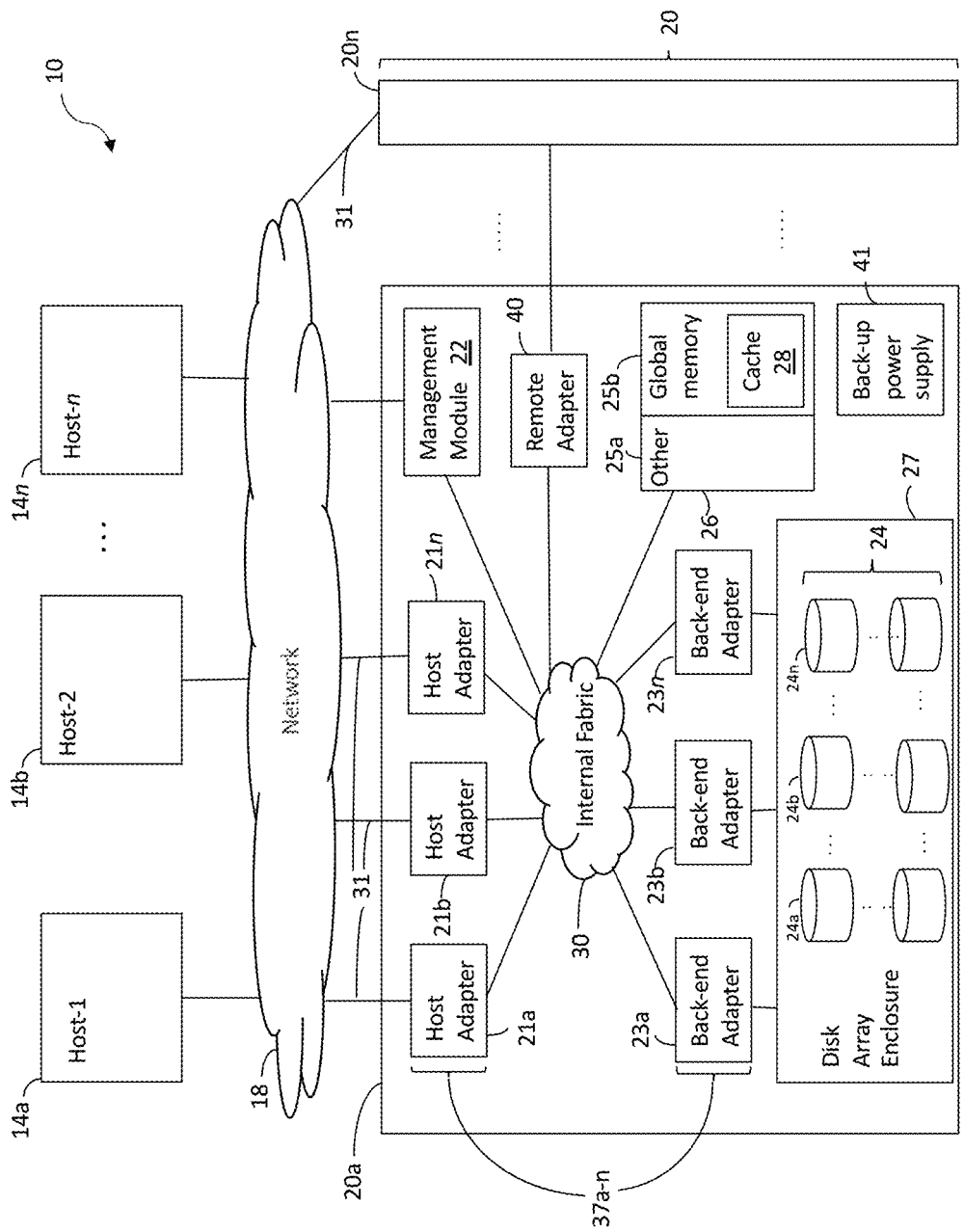
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14*a*-*n* and the storage systems 20*a*-*n* included in the storage network 10 may be connected to the network 18 by any one of a variety of connections as may be provided and supported in accordance with the type of network 18. The processors included in the host computer systems 14*a*-*n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a*-*n* may issue an I/O request to the storage system 20*a* to perform an I/O operation. For example, an application executing on one of the host computers 14*a*-*n* may perform a read or write operation resulting in one or more I/O requests being transmitted to the storage system 20*a*.

Each of the storage systems 20*a*-*n* may be manufactured by different vendors and interconnected (not shown). Additionally, the storage systems 20*a*-*n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14*a*-*n*, for example, to the storage systems 20*a*-20*n*. It should be appreciated that the particulars of the hardware and software included in each of the components that may be included in the storage systems 20*a*-*n* are described herein in more detail, and may vary with each particular embodiment.

Each of the storage systems, such as 20*a*, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24*a*-*n*. In some embodiments, one or more physical storage devices (e.g., one of the rows 24*a*-*n* of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20*a*, a single BE, such as 23*a*, may be responsible for the management of one or more (e.g., a row) of physical storage devices, such as row 24*a*. That is, in some configurations, all I/O communications with one or more physical storage devices 24 may be controlled by a specific BE. BEs 23*a*-*n* may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20*a* also may include one or more host adapters ("HAs") 21*a*-*n*, which also are referred to herein as front-end adapters ("FAs") (e.g., directors configured to serve as FAs). Each of these FAs may be used to manage communications and data operations between one or more host systems and GM 25*b* of memory 26. The FA may be, or include, a Fibre Channel (FC) adapter if FC is a technology being used to communicate between the storage system 20*a* and the one or more host systems 14*a*-*n*, or may be another type of adapter based on the one or more technologies being used for I/O communications.

Also shown in the storage system 20*a* is a remote adapter ("RA") 40. The RA may be, or include, hardware that includes a processor used to facilitate communication between storage systems (e.g., 20*a* and 20*n*), such as between two of the same or different types of storage systems, and/or may be implemented using a director.

Storage system 20*a* also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20*a*, for example, as part of one of host systems 14*a*-*n* or another separate system connected to storage system 20*a* via network 18.

The FAs, BEs and RA may be collectively referred to herein as directors 37*a*-*n*. Each director 37*a*-*n* may include a processing core including compute resources, for example, one or more CPUs cores and/or a CPU complex for processing I/O operations, and may be implemented on a circuit board, as described in more detail elsewhere herein. There may be any number of directors 37*a*-*n*, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
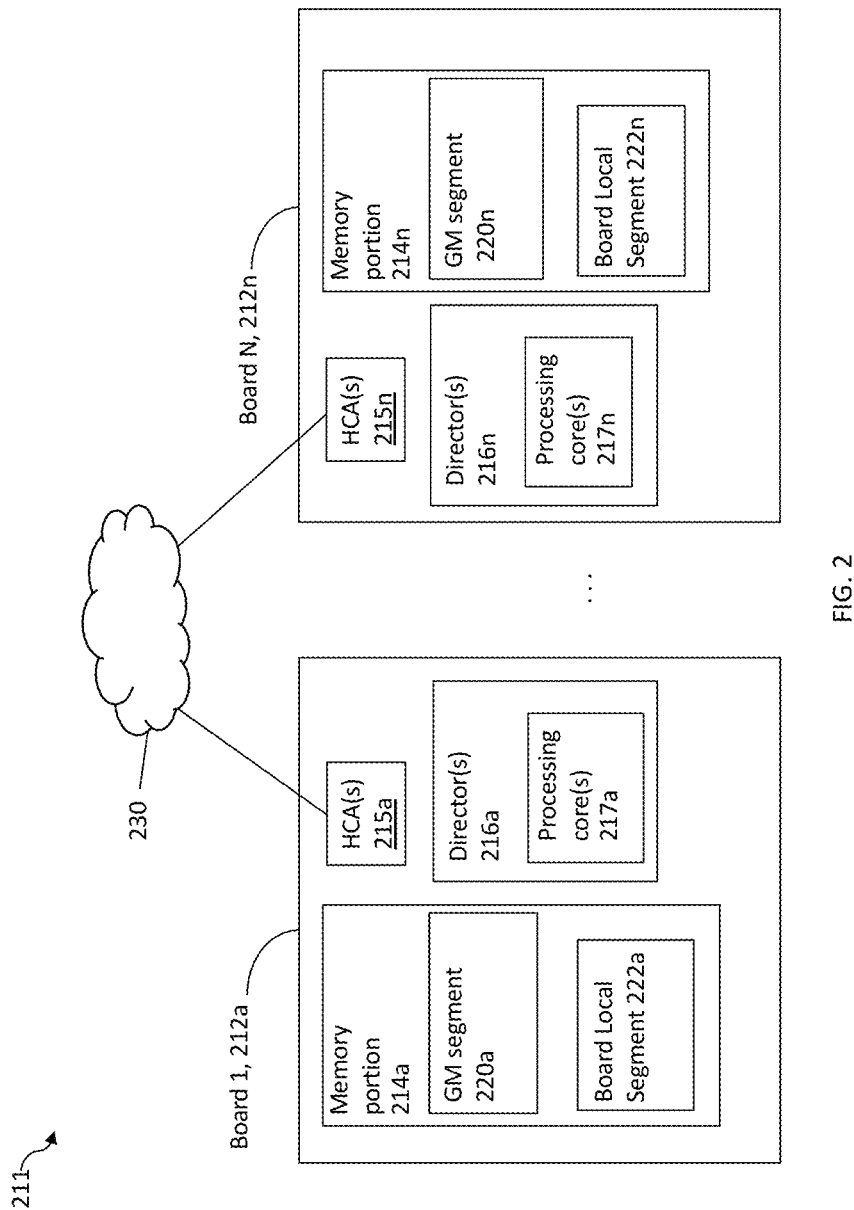
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
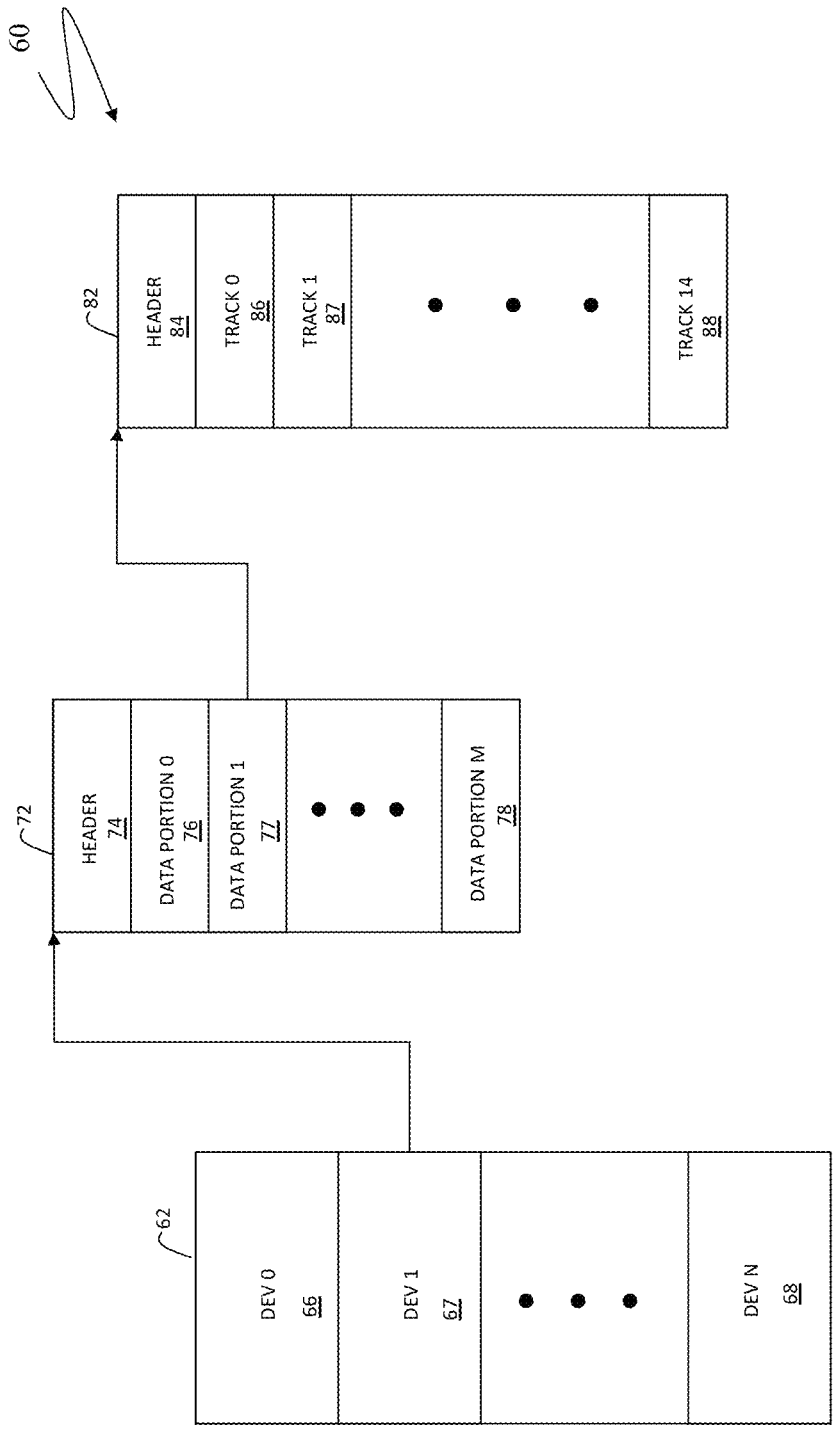
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical devices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 500, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

In some embodiments of the invention, snapshots may be employed, for example, targetless snapshots as described in the Jaganathan patent. In such embodiments, targetless snapshot (TS) data structures such as a replication pointer table, a replication pointer tree, a data pool, a snapshot table and a sequence number pointer table may be employed. These TS data structures will now be briefly described, and may be used in embodiments of the invention, for example, as described in the Jaganathan patent.

Figure 5A:
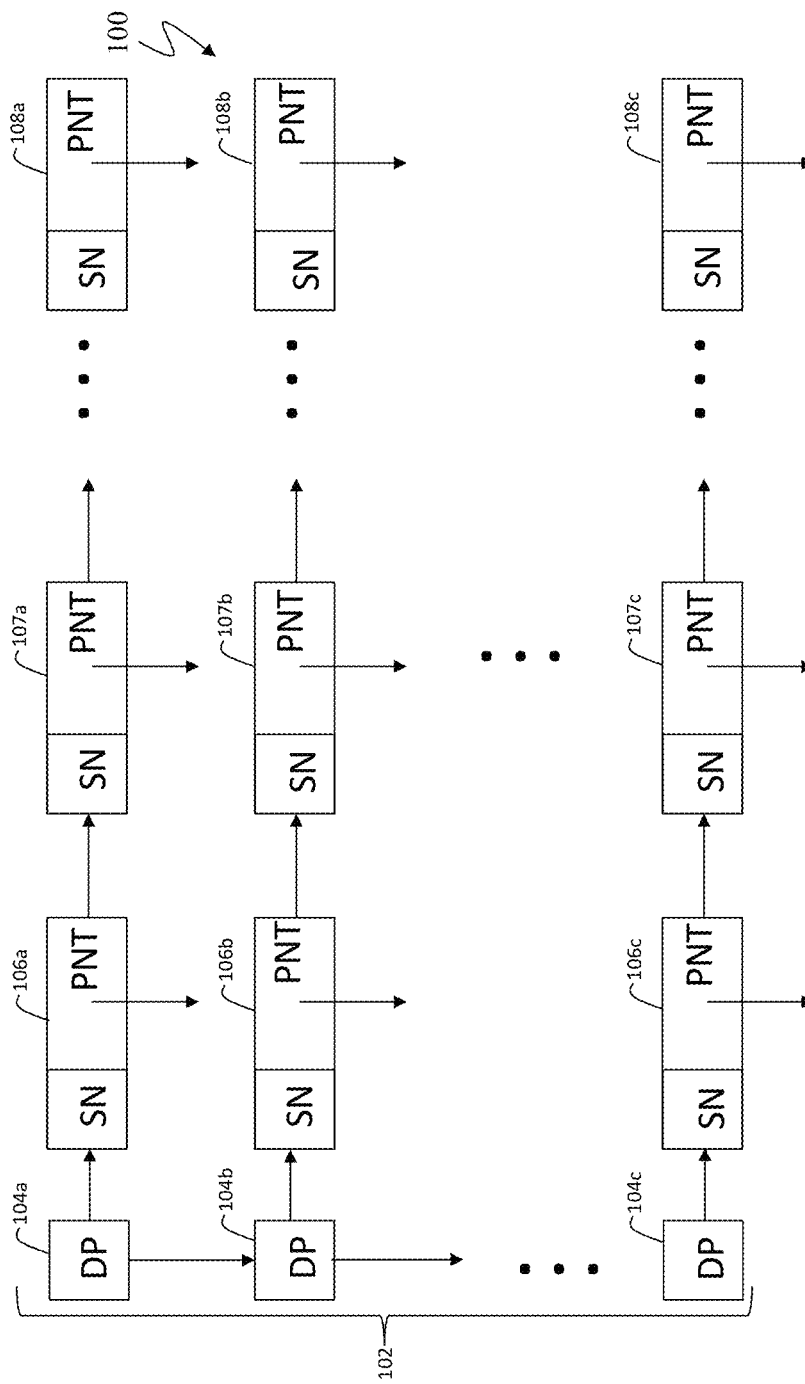
FIG. 5A is a block diagram showing a replication data pointer table, according to embodiments of the invention.

Referring to FIG. 5A, an RDP table 100 includes a first linked list 102 of a plurality of data portion numbers 104*a*-104*c*. The replication data pointers table 100 is used to maintain data that is moved in connection with providing targetless snapshots, as described herein. Each of the data portion numbers 104*a*-104*c* corresponds to a contiguous data portion of an LSU (e.g., a logical device). The LSU may be a conventional logical device with all of the data portions having corresponding physical data storage allocated thereto or may be a thin logical device, described above.

Each of the data portion numbers 104*a*-104*c* corresponds to one or more table entries that are maintained using an appropriate data structure, such as a linked list. The data portion number 104*a* corresponds to a plurality of table entries 106*a*-108*a*, the data portion number 104*b* corresponds to a plurality of table entries 106*b*-108*b*, and the data portion number 104*c* corresponds to a plurality of table entries 106*c*-108*c*. Note that, although the table 100 is illustrated with three data portion numbers 104*a*-104*c* each having three table entries, the table 100 can contain any number of data portion numbers each having any number of table entries. In some cases, for example, as described in the Jaganathan patent, it is possible for there to be no data portion number or corresponding table entries associated with a particular data portion of a logical device. Each of the table entries 106*a*-108*c* includes a sequence number and a pointer to a storage location at which is stored an instance of the data portion corresponding to the sequence number. The sequence number may correspond to a snapshot version, and the storage location may be a location within data pool 115 described in more detail elsewhere herein. Each of the table entries 106*a*-108*c* also may include a reference (i.e., link) to another table entry 106*a*-108*c* corresponding to the same data portion, but for an instance of the data portion corresponding to a different sequence number (i.e., a different snapshot version) and pointing to a different storage location at which the instance of data is stored.

Figure 5B:
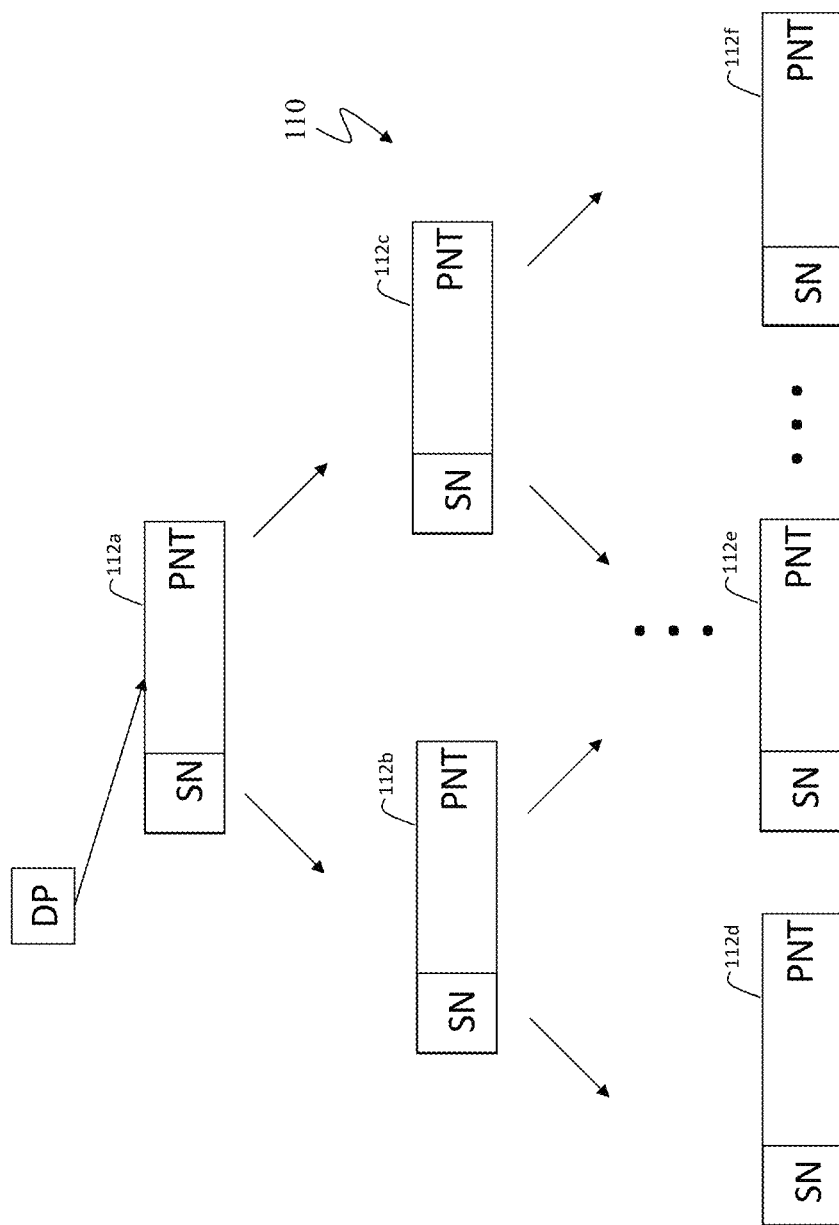
FIG. 5B is a diagram showing a replication data pointer tree, according to embodiments of the invention.

Referring to FIG. 5B, an RDP tree 110 includes a plurality of table entries 112*a*-112*f* that each correspond to a particular data portion. Each of the table entries 112*a*-112*f* may include a sequence number, a pointer to storage and a reference to another one of the table entries 112*a*-112*f*. The replication data pointers tree 110 corresponds to one of the linked lists pointed to by one of the data pointers 104*a*-104*c* of the replications data pointers table 100, discussed above. The sequence number and the pointer to storage are similar to the sequence number and pointer to storage used in connection with the table 100, and are described in more detail elsewhere herein. In an embodiment herein, the tree 110 is a balanced binary tree ordered according to sequence number.

Referring to FIG. 6, a data pool 115 includes storage for data that is moved in connection with maintaining targetless snapshots. Data stored in the data pool 115 is pointed to by the pointers provided with the table entries 106*a*-108*c* or the table entries 112*a*-112*f* In some embodiments, the data pool 115 is provided in a single logical and/or physical location. In other embodiments, the data pool 115 may be distributed and/or may use more than one physical and/or logical data storage element. Providing data to the data pool 115 is discussed in more detail in the Jaganathan patent.

Referring to FIG. 7, a snapshot table 120 includes a plurality of entries corresponding to particular snapshots. Each of the entries includes a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number provided with each of the snapshots is used in connection with providing targetless snapshots and is described in more detail in the Jaganathan patent.

Referring to FIG. 8, a sequence number table 130 is shown as having a plurality of entries. Each of the entries of the table 130 contains a sequence number, described in more detail elsewhere herein. The table 130 can contain a single entry for each data portion number (or other appropriate data increment) of the logical device (e.g., thin logical device) for which targetless snapshots are being provided. Thus, for example, if there are one hundred data portions in a logical device, there are one hundred entries for sequence numbers in the table 130. Use of the sequence number table 130 and of sequence numbers is described in more detail in the Jaganathan patent.

FIG. 9 is a block diagram illustrating an example of a system 900 for managing snapshot metadata, according to embodiments of the invention. Other embodiments of a system for managing snapshot metadata, for example, variations of the system 900, are possible and are intended to fall within the scope of the invention. The system 900 may be implemented on a data storage system, for example, on the data storage system 20a, e.g., by the management module 22 and/or one or more of the directors 37a-n.

The system 900 may include any of: RDP objects 902, 904 and 906; snapshot metadata management (SMM) logic 908; de-allocation management (DM) objects 912, 914 and 916; other SMM objects 918; or any suitable combination of the foregoing. Each RDP object 912, 914 and 916 may be, or include, a plurality of table entries 106a-108c corresponding to data portions 104a-104c (e.g., of an LSU zone) of the RDP table 100; and may be or include a plurality of RDP trees 110, each tree corresponding to a data portion. Each table entry 106a-108c of RDP table 100 and each table entry 112a-112f of RDP tree 110 may be an active node of an RDP object, and if cleared (e.g., as a result of the deletion of a snapshot) may be a free node of an RDP object. Further, each RDP object 912, 914 and 916 may be an RDP object 1300, including a plurality of pages of nodes, as described in connection with FIGS. 13a-13f and elsewhere herein.

The SMM logic 908 may be configured to manage snapshot metadata, for example, to make more efficient use of memory, e.g., as described in more detail elsewhere herein. De-allocation eligibility logic 910 may be configured to determine de-allocation eligibility of an RDP object, as described in more detail elsewhere herein. Other SMM objects may include any of a variety of other objects, e.g., data structures, for managing snapshot metadata, for example, any of RDP table 100, RDP tree 110, data pool 115, snapshot table 120, sequence number table 130, and other objects for managing snapshot metadata described in the Jaganathan patent. There may be more or less than the three RDP objects 902, 904 and 906 illustrated; and more or less than the three de-allocation management objects 912, 914 and 916 illustrated. Each of the de-allocation management objects 912, 914 and 916 may be a data structure including information used in managing the de-allocation of nodes (e.g., pages of nodes) from RDP objects 902, 904 and 906, respectively. Each of the de-allocation management objects 912, 914 and 916 may be implemented as a de-allocation management object 1000, which will now be described.

FIG. 10 is a block diagram illustrating an example of a data structure (also referred to herein as de-allocation management (DM) object) 1000 for managing the de-allocation of snapshot management metadata from memory, according to embodiments of the invention. Other embodiments of a data structure for managing the de-allocation of snapshot metadata from memory, for example, variations of the DM object 1000, are possible and are intended to fall within the scope of the invention.

A storage system may have a plurality of DM objects 1000, each DM object 1000 corresponding to an LSU zone of an LSU. Each DM object 1000 may include any of: LUN ID field 1002; zone index field 1004; total node count field 1006; total active node count field 1008; active node list field 1010; free list pointer field 1012; total free node count field 1014; free node list field 1016; page information 1018; de-allocation eligibility field 1019; other information fields; and any suitable combination of the foregoing. The LUN ID field 1002 may specify the LSU ID (e.g., logical device number) of the LSU that includes the LSU zone to which the RDP object corresponds.

The zone index field may specify the LSU zone corresponding to the RDP object. The total node count field 1006 may specify the total count of nodes within the RDP object. The total active node count field 1008 may specify the total number of active nodes in the RDP object. The active node list field 1010 may list all of the active nodes of the RDP object, for example, by specifying the memory addresses of each active node. In some embodiments, the active node list 1010 may be a linked list of active nodes, in which each active node in the active node list includes a link to a next.

The total free node count field 1014 may specify the total number of free nodes in the RDP object. The free node list field 1016 may list all of the free nodes of the RDP object, for example, by specifying the memory addresses of each free node. In some embodiments, the free node list 1016 may be a linked list of free nodes, in which case each free node in the free node list 1016 includes a link to a next free node accordingly to a logical order of nodes. The free list pointer field 1012 may point to the first free node in a linked list of free nodes.

The page information field 1018 may include information about pages of the RDP object, for example, any of: the number of pages; the starting memory address and size of each page and/or the full address range of each page; the number of active and/or free nodes in each page; and other information.

The de-allocation eligibility field 1019 may include one or more fields to specify values used in determining de-allocation eligibility of an RDP object. The de-allocation eligibility field 1019 may include any of: last period maximum field 1020; current period maximum field 1022; maximum value field 1024; period length field 1026; free node threshold 1028; memory consumption threshold 1030; de-allocation flag 1032; other fields; or any suitable combination of the foregoing. The last period maximum field 1020 may specify a maximum extent of active nodes at any (measured) time during a most recent (i.e., last) previous period, for example, the largest number of active nodes at any point during the last period or the largest percentage of active nodes during the last period (out of a total number of nodes including active and free nodes). The current period maximum field 1022 may specify a maximum extent of active nodes at any (measured) time during the current period, for example, the largest number of active nodes at any point during the current period or the largest percentage of active nodes during the current period (out of a total number of nodes including active and free nodes).

The maximum value field 1024 may specify a value that is the maximum value determined between the last period maximum specified in the field 1022 and the current period maximum specified in the field 1022; i.e., max value=max{last period maximum, current period maximum}. Period length field may specify a value that is the duration of time over which the last period maximum and current period maximum are specified.

The free node threshold 1028 may specify a threshold quantity of free nodes that needs to be met in order to be eligible for de-allocation of free nodes, according to some embodiments of the invention described in more detail elsewhere herein.

The memory consumption threshold 1030 may specify a threshold amount of memory consumption by RDP objects collectively on the storage system, which may be used to control the size of the periods during which maximum activity extents are determined, as described in more detail elsewhere herein. The memory consumption threshold 1030 may be a global parameter that is not specific to any one RDP object.

The de-allocation flag 1032 may be set to reflect when an RDP object is currently undergoing de-allocation; e.g., that it was determined that the RDP object is eligible for such de-allocation, and the node consolidation and memory footprint reduction described in relation to method 1000 are currently in progress for the RDP object.

The values specified in de-allocation eligibility field 1019 may be used to determine eligibility of an RDP object for de-allocation of one or more nodes (e.g., pages of nodes), as described in more detail elsewhere herein, for example, in relation to method 1200 illustrated in FIG. 12.

One or more fields of the DM object 1000, for example, those specific to an RDP object, may be included as part of an RDP object header, as described in more detail elsewhere herein.

FIG. 11 is a flowchart illustrating an example of a method 1100 of managing snapshot metadata, according to embodiments of the invention. Other embodiments of a method of managing snapshot metadata, for example, variations of the method 1100, are possible and are intended to fall within the scope of the invention. The method 1100 may be implemented by the snapshot management logic 908.

In a step 1102, it may be determined whether an RDP object is eligible to have one or more of its nodes (e.g., one or more pages of nodes) de-allocated from memory. In some embodiments of the invention, the step 1102 includes determining a total count of free nodes in the RDP object, and comparing this total count to a free node threshold, for example, the free node threshold specified in field 1030 of the de-allocation eligibility field 1019. In embodiments in which RDP nodes are de-allocated according to RDP page boundaries, the free node threshold may be determined to be a multiple of the quantity of nodes in a page. The free node threshold may be defined to be high enough to accommodate the need for additional active nodes for ongoing snapshot creation concurrently to method 1100 being performed. That is, even though one-page-worth of free nodes may be enough to perform de-allocation, new active nodes may need to be created for new snapshots, and some active nodes may not be available for usage while being swapped with free nodes as described herein. On the other hand, if the threshold is made too high, memory space saving are not as significant. In some embodiments, the free node threshold may be set to three times the size of a page, but it should be appreciated that other threshold values may be used.

Figure 14:
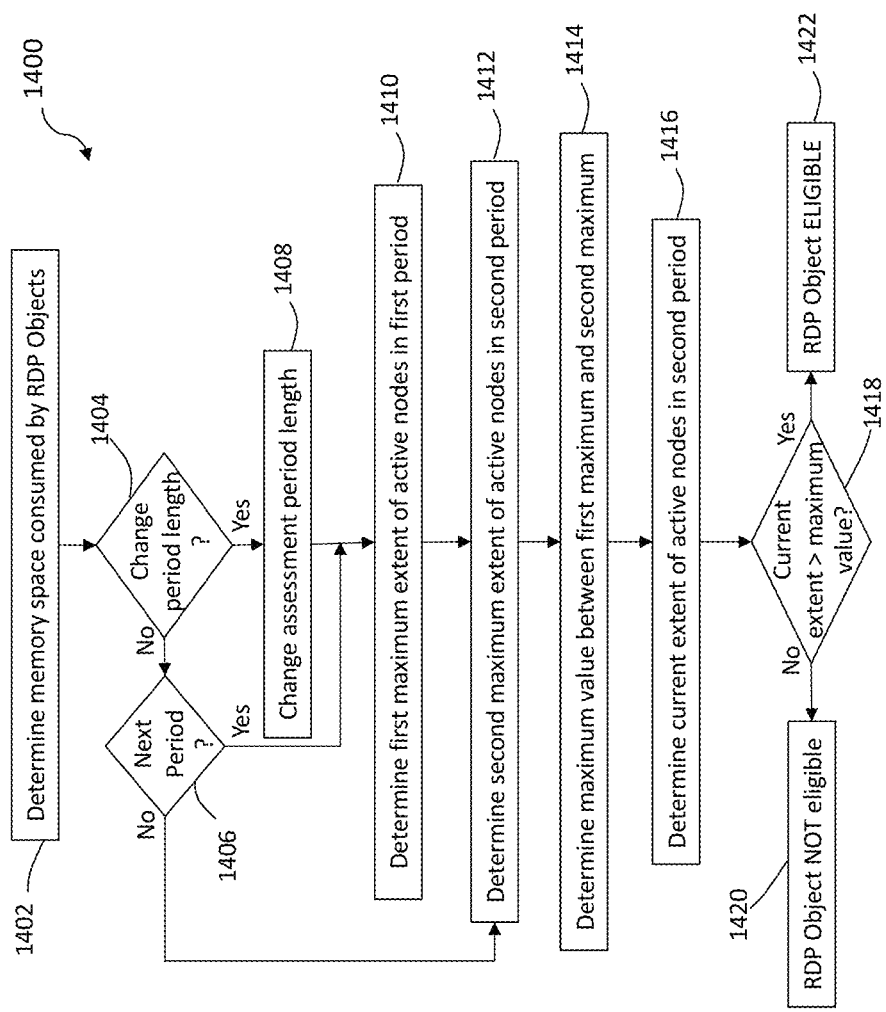
FIG. 14 is a flowchart illustrating an example of a method of determining whether to de-allocate a portion of memory used to manage snapshot metadata, according to embodiments of the invention.

In some embodiments, the step 1102 may be performed as described in more detail elsewhere herein, for example, in accordance with the method 1400 described in relation to FIG. 14.

If it is determined that the RDP object in ineligible for de-allocation, then the method 1100 may return to the step 1102. That is, the step 1102 may be repeated at a scheduled time (e.g., periodically), for example, once every hour, and the frequency with which the step 1102 is performed may be adjusted, for example, based on the collective memory consumption of the RDP objects of the data storage system, as described in more detail elsewhere herein. The step 1102 also may be performed in response to an event, for example, a user instruction.

In a step 1104, the free nodes of the RDP object may be consolidated, for example, in a last page of the RDP object. The step 1104 may be performed as described in more detail elsewhere herein, for example, by performance of a method 1200 described in relations to FIG. 12.

In a step 1106, the last page of the RDP object may be de-allocated from the memory allocated for the RDP object. That is, the last page of nodes of the RDP object may be returned to the memory pool of the storage system (for example, a global memory).

FIG. 12 is a flowchart illustrating an example of a method 1200 of consolidating free nodes into a last page of a data structure for managing snapshot metadata, according to embodiments of the invention. Other embodiments of a method of consolidating free nodes into a last page of a data structure for managing snapshot metadata, for example, variations of the method 1200, are possible and are intended to fall within the scope of the invention.

The method 1200 will be described in relation to FIGS. 13A-13F, which illustrate an example of de-allocating a portion of memory used to manage snapshot metadata, according to embodiments of the invention. FIGS. 13A-13F include an RDP object 1300 including a plurality of pages of nodes. For example, in FIG. 13A, the RDP object 1300 includes Page 0-page 4. Each page includes a plurality of nodes, for example, nodes 1304 of Page 4, where at least initially, before a first performance of the method 1200, each node has a status of "FREE" or "USED." A node in the RDP object 1300 having a status of "FREE" is a free node as described herein, and a node in the RDP object 1300 having a status of "USED" is an active node as described herein.

One of the pages of an RDP object may include a header that include snapshot metadata information associated with the RDP object. For example, Page 0 of the RDP Object 1300 includes a header 1302. Header 1302 may include any of the fields of DM object 1000 described elsewhere herein and/or other metadata information pertinent to the RDP object 13

Returning to the method 1200, in a step 1201, a start of a last page of the RDP object may be determined. For example, a starting memory address of the last page may be determined, e.g., by referencing the page information in the page information field 1018 of the DM object 1000. For example, Page 4 may be determined to be the last page of RDP object 1300.

In a step 1202, it may be determined whether there is a next (e.g., first) free node in the last page 1202, for example, by accessing a free node list, for example, the free node list specified in the free node list field 1016. If there is a next free node, then in a step 1203 it may be designated for de-allocation, for example, by marking the node; i.e., by altering the contents of these nodes, for example, by stamping them with a value. Additionally or alternatively, the node may be designated for de-allocation by removing it from the free node list. After the step 1203, the method may return to the step 1202, and steps 1202 and 1203 may be repeated until all free nodes from the last page have been designated for de-allocation. For example, FIG. 13B illustrates the RDP object 1300 after the steps 1202 and 1204 have been performed for all nodes of Page 4, in which previously free nodes are now marked as "STAMP."

If it is determined in the step 1202 that there is not a next free node in the last page, then in step 1204 it may be determined whether there is a next active node in the last page. The step 1204 may include accessing the active node list field 1010. If it is determined that there is not a next active node in the last page, then the method 1200 may end.

Figure 13C:
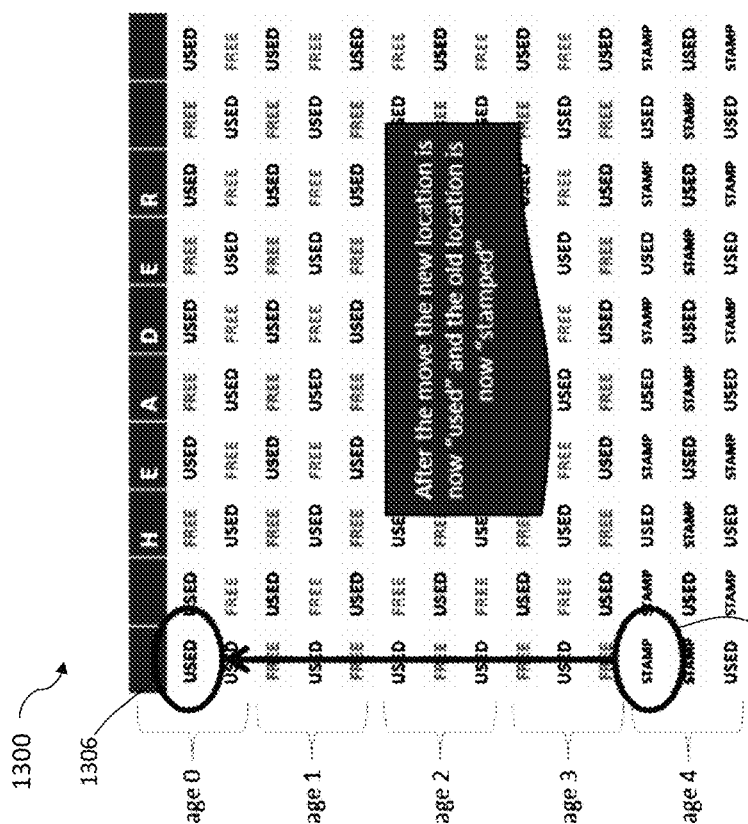

If it is determined in the step 1204 that there is a next active node in the last page (e.g., the node 1308 of Page 4 of the RDP object 1300 illustrated in FIG. 13C), then in a step 1200 a next free node of an earlier page may be determined. For example, on a first pass through the step 1206, a first free node of the first page may be determined (e.g., the node 1306 of Page 0 of the RDP object 1300 illustrated in FIG. 13C), and a second free node of the first page may be selected during a second pass. On a future pass through the step 1204, there may be no free pages left in the first page, and a first free node of the second page may be selected, and so on. On a first pass through the step 1206, an earliest page (e.g., first page) having free nodes may be determined, for example, by accessing the page information in the page information field 1018 of the DM object 1000. A next free node may be determined by accessing the free node list field 1016, for example, using the page information determined from the page information field 1016 to determine where to start on the free node list. In some embodiments, on future passes through the step 1206, a next free node may be determined by determining a next linked node (after the free node determined in the last pass) in a linked list of free nodes specified by the free node list field 1016.

In a step 1208, the contents of an active node may be copied from the active node determined in the step 1204 to the free node determined in the step 1206. For example, the contents of the active node may include: a snapshot identifier; a location (e.g., on a physical storage device and/or in cache) at which a version of the data portion corresponding to the identified snapshot is stored; and a reference or link to a next active node in a linked list of active nodes.

In a step 1210, one or more elements of snapshot metadata may be updated. For example, the active node of the last page determined in the step 1204 may be removed from the active node list specified in the active node list field 1010, and the free node of the earlier page determined in the step 1206 may be added to the active node list such that the free node has now become an active node.

Figure 13D:
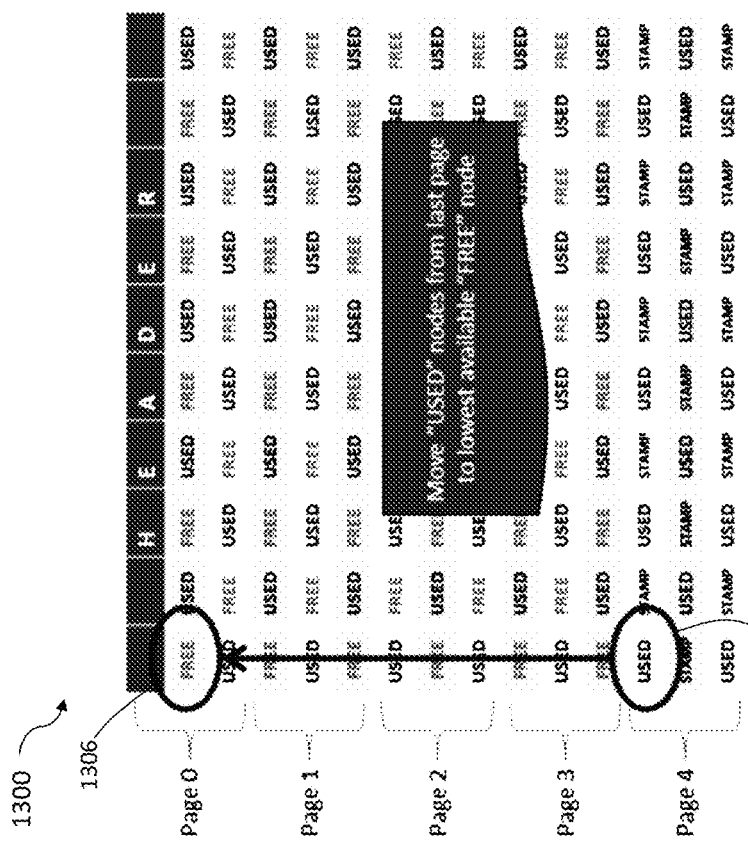

In a step 1212, the active node of the last page, whose contents were copied to the previously free, but now active, node of the earlier page, may be designated for de-allocation, for example, in a same or similar manner to as described in relation to 1203 for free nodes of the last page. FIG. 13D illustrates the result of performing the step 1208-1212 on nodes 1308 and 1306.

Figures 13E, 13F:
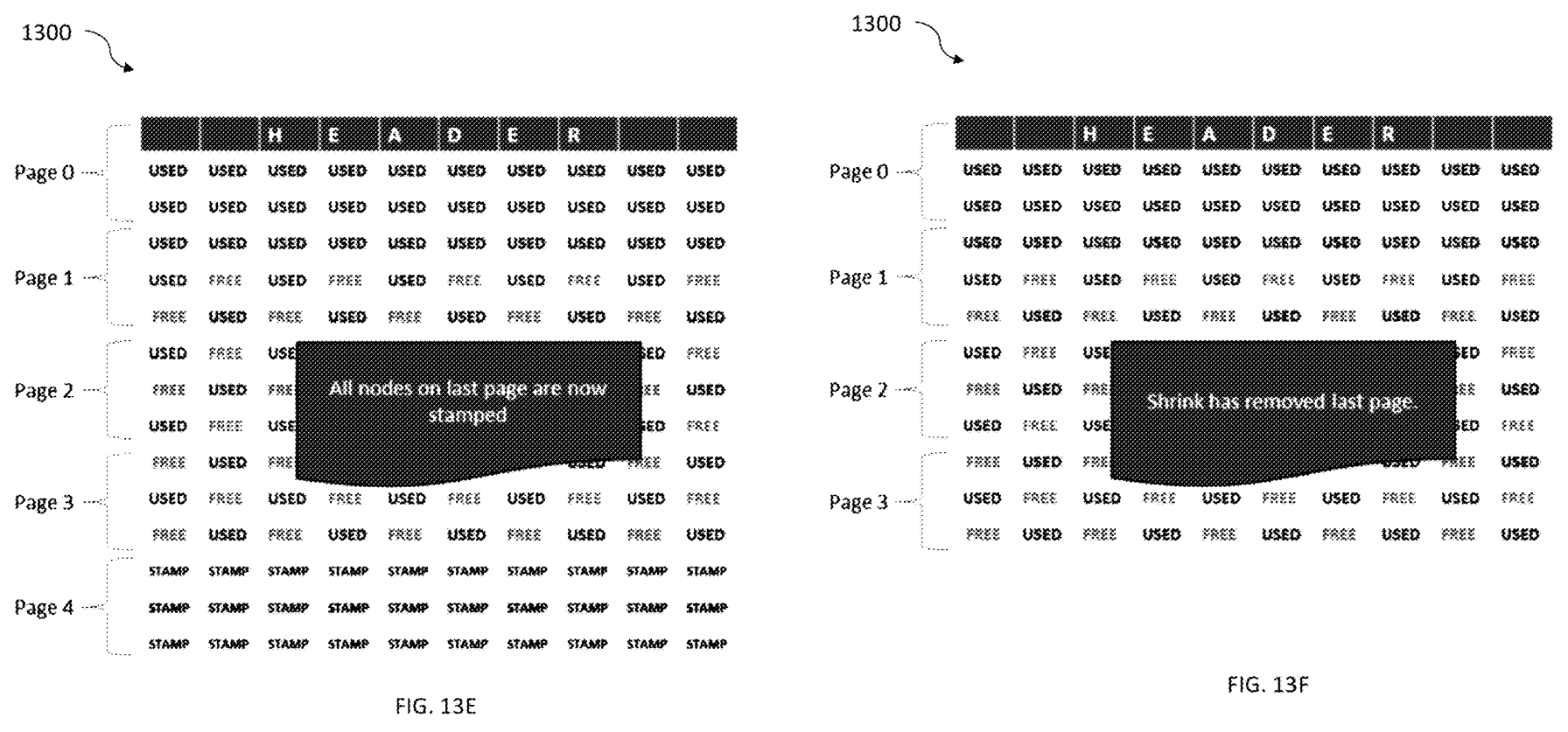

The steps 1204-1212 may be repeated until all previously active nodes of the last page are now designated for de-allocation, for example, as illustrated in FIG. 13E for Page 4. The last page then may be de-allocated as described in relation to step 1106, for example, as illustrated in FIG. 13F, in which Page 4 has been removed from RDP object 1300.

FIG. 14 is a flowchart illustrating an example of a method 1400 of determining whether to de-allocate a portion of memory used to manage snapshot metadata, according to embodiments of the invention. Other embodiments of a method of determining whether to de-allocate a portion of memory used to manage snapshot metadata, for example, variations of the method 1400, are possible and are intended to fall within the scope of the invention.

Figure 15:
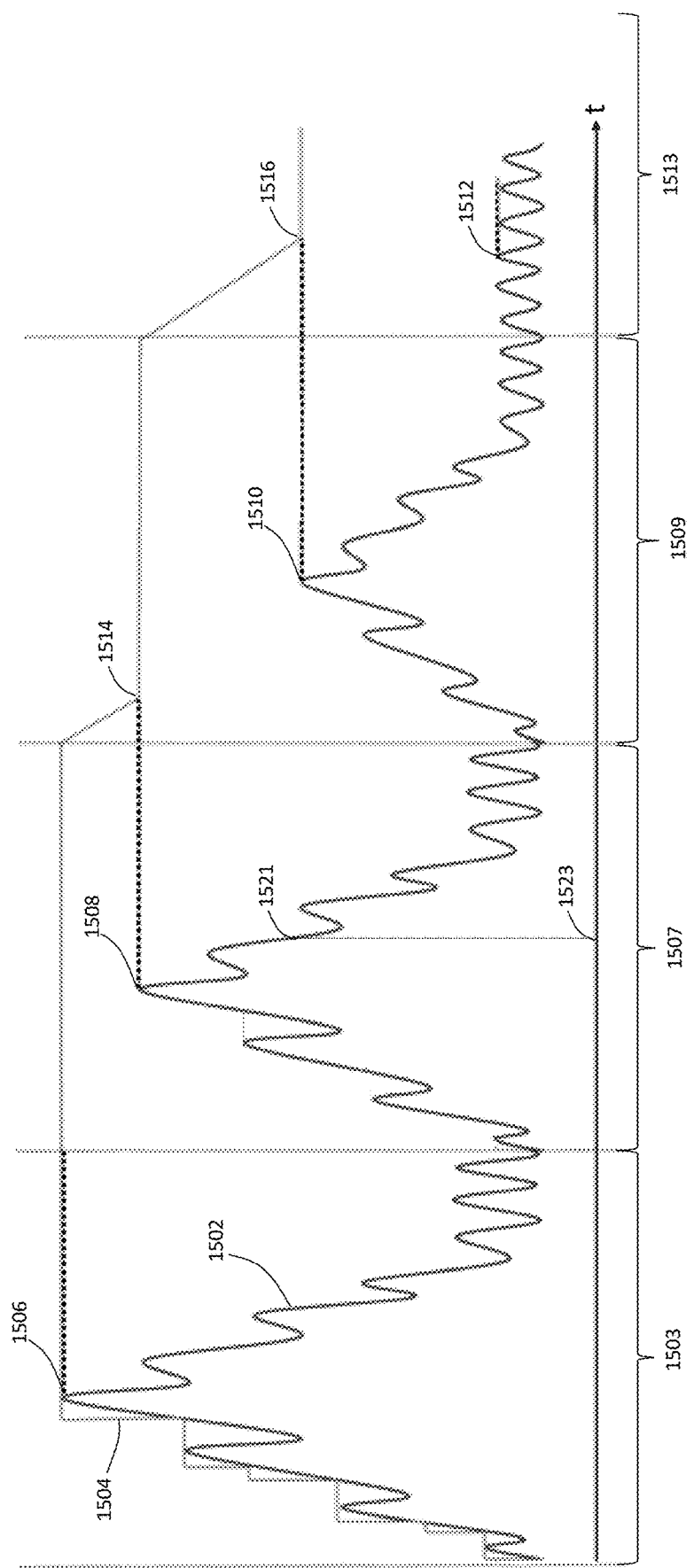
FIG. 15 is a graph illustrating managing a memory footprint of a data structure for snapshot metadata, according to embodiments of the invention.
Figure 16:
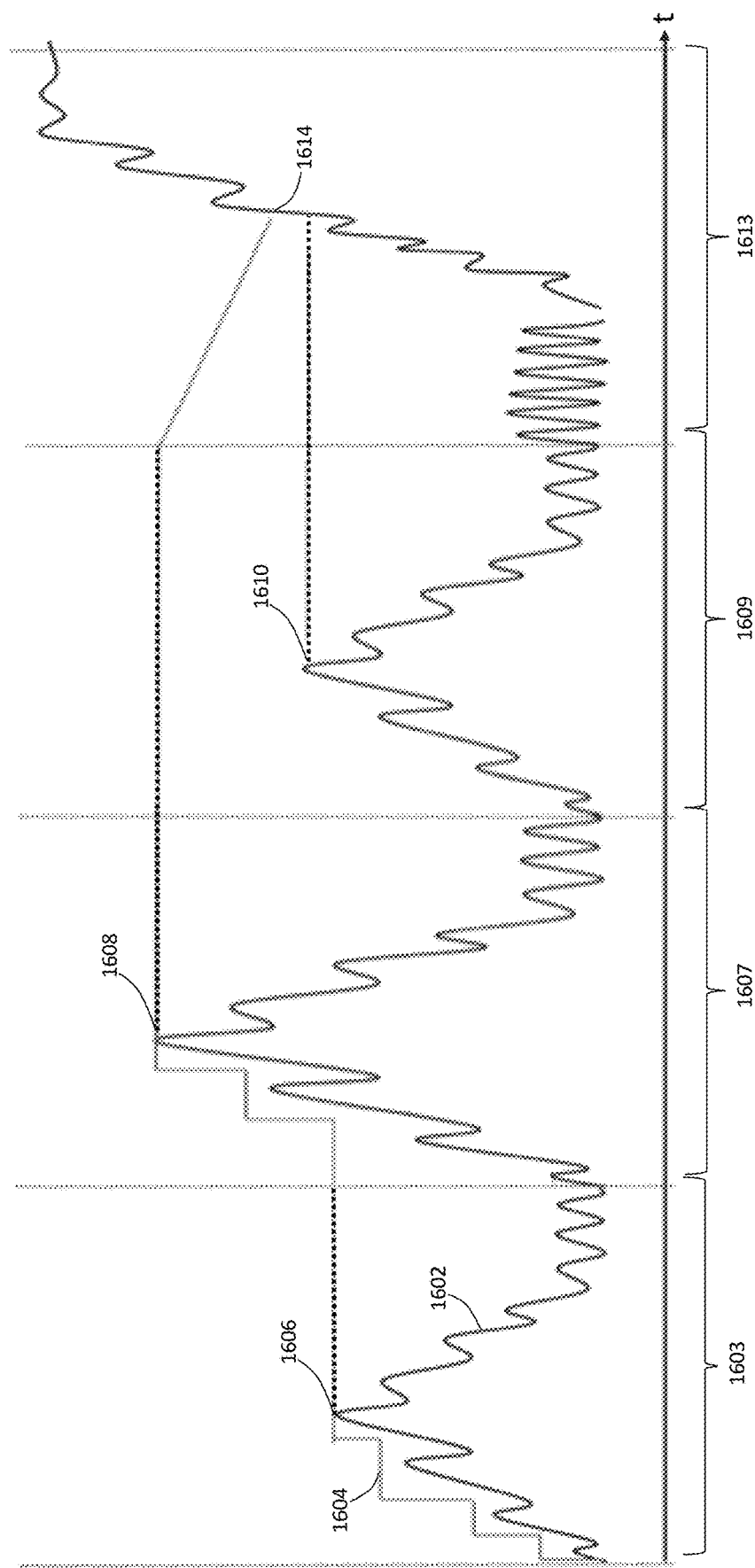
FIG. 16 is a graph illustrating managing a memory footprint of a data structure for snapshot metadata, according to embodiments of the invention.

Various aspects of the method 1400 may be described in relation to the graphs 1500 and 1600 of FIGS. 15 and 16, respectively, according to embodiments of the invention, in which the horizontal axes represent time, with temporal intervals 1503, 1507, 1509, 1513, 1603, 1607, 1609 and 1613 representing periods of time. The solid-lined curves 1502 and 1602 represent the quantity of active nodes in an RDP object at a particular time, and the lighter solid-lined, generally rectilinear lines 1504 and 1604 represent a size of the RDP object at a given time. The dashed lines 1506, 1508, 1510, 1512, 1606, 1608 and 1610 each represent a maximum quantity of active nodes detected at any given time during a period. The increases in curves 1502 and 1602 reflect a growth in the size of the represented RDP object as a result of write operations between snapshots, in accordance with descriptions herein. These increases may be stepwise as illustrated if new nodes are allocated by the page; i.e., each increase is an increase in nodes is an increase by at least one memory page.

In a step 1402, the memory space consumed collectively by all RDP objects in memory of the storage system (i.e., the memory footprint of the RDP objects) may be determined, for example, by determining the collective memory address range of the RDP objects.

In a step 1404, it may be determined whether to change a length of the assessment periods during which the maximum extent of active nodes is determined, for example, based on the memory space consumed as determined in the step 1402. For example, it may be determined whether the determined memory consumed exceeds the memory consumption threshold 1030 that specifies a threshold amount of memory consumption by RDP objects collectively on the storage system, In some embodiments, if it is determined that the consumed memory space exceeds the memory consumption threshold 1030, then in a step 1408 a length of the assessment periods for determining maximums may be changed. For example, it may be desirable to shorten the assessment periods so that the memory footprint of the snapshot metadata can be assessed and as necessary reduced more frequently to make more efficient use of memory space. Table 1 illustrates examples of memory consumption thresholds and the assessment periods that would result. For example, a default assessment period length may be twenty four hours, and as memory consumption exceeds 80% and other higher thresholds, the assessment period may be adjusted to be shorter and shorter as illustrated in Table 1.

TABLE 1

Consumption Thresholds and Resulting Assessment Periods

| Memory Consumption Threshold | Assessment Period |
| --- | --- |
| 80% | 12 hours |
| 90% | 6 hours |
| 95% | 2 hours |
| 97% | 1 hours |
| 98% | 30 minutes |
| 99% | 5 minutes |

Conversely, the determination in the step 1404 may be that the period be lengthened, for example, if the assessment period was previously shortened, but now a determined memory space consumption is lower than a particular threshold.

In a step 1410, a first maximum extent (e.g., quantity or percentage) of active nodes during a first period may be determined. For example, the first period may be a period immediately preceding the current period. For example, referring to FIG. 15, during period 1507, a maximum quantity 1506 of active nodes for period 1503 may be determined.

In a step 1412, a second maximum extent (e.g., quantity or percentage) of active nodes during a second period may be determined. For example, the second period may be the current period. For example, referring to FIG. 15, during period 1507, a maximum quantity 1508 of active nodes for period 1507 may be determined. It should be appreciated that in embodiments in which the second period is the current period, the second maximum may change each time the step 1412 is performed, as there is more data from the current period to consider each time the step is performed, or it is a new period.

In a step 1414, a maximum value between the first maximum and the second maximum may be determined. For example, referring to FIG. 15, the maximum value=max{1506, 1508}=1506.

In a step 1416, a current extent of active nodes in the second period may be determined. For example, referring to FIG. 15, a current quantity 1521 of active nodes at current time 1523 may be determined.

In a step 1418, it may be determined whether the current extent of active nodes is greater than the maximum value. If the current extent is determined to be greater than the maximum value, then it may be determined in a step 1422 that the RDP object is eligible for de-allocation; otherwise, in a step 1420 it may be determined that the RDP object is not eligible for de-allocation. Continuing with the example from FIG. 15, the maximum value=the value 1506, which is greater than the current value 1509. Thus, in this example, in step 1420 it would be determined that the RDP object is not eligible for de-allocation.

In another example from FIG. 15, consider a first performance of the method 1400 during time period 1509. In such a case, the first maximum is 1508 and the second maximum is obviously less (and will be throughout the period 1509) so that the maximum value is 1508. Further, during this first performance, the current extent of active nodes is less than the determined maximum value. Accordingly, it is determined in the step 1422 that RDP object is eligible for de-allocation, and performance of the steps 1104 and 1106 of the method 1100 may result in the reduction in size of the represented RDP object illustrated by reference 1514. Similarly, during performance of the method 1400 during the period 1513, the RDP object size may be further reduced as illustrated by reference 1516. In yet another example from FIG. 16, during performance of the method 1400 during the period 1613, the RDP object size may be reduced as illustrated by reference 1614.

Returning to the step 1404, if it is determined not to change period length, then in an act 1406, it may be determined whether the current point in time is a new period. For example, if the period is an hour, and every period changes on the hour (e.g., at 1:00, 2:00, 3:00, etc.), then the step 1406 may determine whether the current point in time is a first time at which an extent of active nodes will be determined since a last change of the hour (e.g., since 1:00). If it is not a new period of time, it is not necessary to determine the first maximum extent, and the method 1400 passes to the step 1412. However, if it determined that it is a new period of time, then the first period may have changed, for example, if the first period is the immediately preceding period, in which case the method 1400 may proceed to the step 1410. It should be appreciated that when it is determined in the step 1404 that there is a change of period (e.g., because of memory consumption), both the first and second periods change, and step 1410 is performed.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100, 1200 and 1400, or parts thereof, may be implemented using one or more of the systems and/or data structures described in relation to FIGS. 1-10 and 13, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data structure including snapshot metadata for a logical storage unit and residing in a portion of memory of a data storage system allocated to the data structure, the data structure including a plurality of pages, wherein each page including a first quantity of nodes and wherein each node is either an active node currently being used and corresponding to a data portion of the logical storage unit or a free node eligible for use for a data portion of the logical storage unit, a method comprising:

for a first period of time during which an extent of active nodes within the data structure changes over time, determining a first maximum extent of active nodes within the data structure during the first period;

determining a current extent of active nodes within the data structure;

determining a second maximum extent of active nodes within the data structure during a second period including the point in time at which the current extent is determined;

determining whether to de-allocate a plurality of the free nodes of the data structure from the portion of memory based at least in part on the first maximum extent and the current extent and the second maximum extent, and wherein said determining whether to de-allocate further includes:

determining a maximum value from the first maximum extent and the second maximum extent;

determining if the current extent is greater than the maximum value; and determining to de-allocate said plurality of free nodes if the current extent is greater than the maximum value; and if it is determined to de-allocate a plurality of the free nodes, de-allocating the plurality of the free nodes from the portion of memory.

2. The method of claim 1, wherein said de-allocating the plurality of the free nodes from the portion of memory includes:

consolidating the first quantity of the free nodes in a first page of the plurality of pages; and de-allocating the first page from the portion of memory allocated to the data structure.

3. The method of claim 2, wherein said consolidating includes exchanging active nodes of the first page for free nodes of one or more other pages of the plurality of pages.

4. The method of claim 1, wherein maximum extents are determined for a plurality of periods, each period having a first length, wherein the data structure is one a plurality of data structures tracking versions of data portions of logical storage units on the data storage system, and wherein the method further comprises:

determining a collective amount of the memory consumed by the plurality of data structures;

determining if the collective amount of memory exceeds a threshold amount; and if the collective amount of memory exceeds the threshold amount, changing the first length to a second length shorter than the first length.

5. The method of claim 1, wherein the first period is a previous calendar day from a time at which the current extent is determined.

6. A data storage system comprising:

a memory;

a data structure including snapshot metadata for a logical storage unit and residing in a portion of the memory allocated to the data structure, the data structure including a plurality of pages, wherein each page including a first quantity of nodes, and wherein each node is either an active node currently being used and corresponding to a data portion of the logical storage unit or a free node eligible for use for a data portion of the logical storage unit, wherein the memory has code stored thereon that, when executed, performs a method including:

for a first period of time during which an extent of active nodes within the data structure changes over time, determining a first maximum extent of active nodes within the data structure during the first period;

determining a current extent of active nodes within the data structure;

determining a second maximum extent of active nodes within the data structure during a second period including the point in time at which the current extent is determined;

determining whether to de-allocate a plurality of the free nodes of the data structure from the portion of memory based at least in part on the first maximum extent and the current extent and the second maximum extent, and wherein said determining whether to de-allocate further includes:

determining a maximum value from the first maximum extent and the second maximum extent;

determining if the current extent is greater than the maximum value; and determining to de-allocate said plurality of free nodes if the current extent is greater than the maximum value; and if it is determined to de-allocate a plurality of the free nodes, de-allocating the plurality of the free nodes from the portion of memory.

7. The data storage system of claim 6, wherein said de-allocating the plurality of the free nodes from the portion of memory includes:

consolidating the first quantity of the free nodes in a first page of the plurality of pages; and de-allocating the first page from the portion of memory allocated to the data structure.

8. The data storage system of claim 7, wherein said consolidating includes exchanging active nodes of the first page for free nodes of one or more other pages of the plurality of pages.

9. The data storage system of claim 6, wherein maximum extents are determined for a plurality of periods, each period having a first length, wherein the data structure is one a plurality of data structures tracking versions of data portions of logical storage units on the data storage system, and wherein the method further comprises:

determining a collective amount of the memory consumed by the plurality of data structures;

determining if the collective amount of memory exceeds a threshold amount; and if the collective amount of memory exceeds the threshold amount, changing the first length to a second length shorter than the first length.

10. The data storage system of claim 6, wherein the first period is a previous calendar day from a time at which the current extent is determined.

11. For a data structure including snapshot metadata for a logical storage unit and residing in a portion of memory of a data storage system allocated to the data structure, the data structure including a plurality of pages, wherein each page including a first quantity of nodes, and wherein each node is either an active node currently being used and corresponding to a data portion of the logical storage unit or a free node eligible for use for a data portion of the logical storage unit, one or more non-transitory computer-readable media having software stored thereon comprising:

executable code that determines, for a first period of time during which an extent of active nodes within the data structure changes over time, a first maximum extent of active nodes within the data structure during the first period;

executable code that determines a current extent of active nodes within the data structure;

executable code that determines a second maximum extent of active nodes within the data structure during a second period including the point in time at which the current extent is determined;

executable code that determines whether to de-allocate a plurality of the free nodes of the data structure from the portion of memory based at least in part on the first maximum extent and the current extent and the second maximum extent, wherein said executable code that determines whether to deallocate further includes:

executable code that determines a maximum value from the first maximum extent and the second maximum extent;

executable code that determines if the current extent is greater than the maximum value; and executable code that determines to de-allocate said plurality of free nodes if the current extent is greater than the maximum value; and executable code that, if it is determined to de-allocate a plurality of the free nodes, de-allocates the plurality of the free nodes from the portion of memory.

12. The one or more non-transitory computer-readable media of claim 11, wherein said executable code that de-allocates the plurality of the free nodes from the portion of memory includes:

executable code that consolidates the first quantity of the free nodes in a first page of the plurality of pages; and executable code that de-allocates the first page from the portion of memory allocated to the data structure.

13. The one or more non-transitory computer-readable media of claim 12, wherein said executable code that consolidates further includes executable code that exchanges active nodes of the first page for free nodes of one or more other pages of the plurality of pages.

14. The one or more non-transitory computer-readable media of claim 11, wherein maximum extents are determined for a plurality of periods, each period having a first length, wherein the data structure is one a plurality of data structures tracking versions of data portions of logical storage units on the data storage system, and wherein the software further comprises:

executable code that determines a collective amount of the memory consumed by the plurality of data structures;

executable code that determines if the collective amount of memory exceeds a threshold amount; and executable code that, if the collective amount of memory exceeds the threshold amount, changes the first length to a second length shorter than the first length.

* * * * *